United States Patent [19]
Gardellin

[11] Patent Number: 5,708,210
[45] Date of Patent: Jan. 13, 1998

[54] PRESSURE MONITORING ISOLATING DEVICE

[76] Inventor: David Gardellin, Burlington, N.J.

[21] Appl. No.: 614,215

[22] Filed: Mar. 12, 1996

[51] Int. Cl.$^6$ ................................ G01L 7/02; G01L 7/00
[52] U.S. Cl. ........................................ 73/730; 73/756
[58] Field of Search ................................ 73/730, 756

[56] References Cited

U.S. PATENT DOCUMENTS

| | | | |
|---|---|---|---|
| 2,017,365 | 10/1935 | Klein | 73/756 X |
| 3,163,529 | 12/1964 | Jewett | 73/406 |
| 3,178,944 | 4/1965 | Templeton | 73/756 |
| 3,183,722 | 5/1965 | Unger et al. | 73/756 X |
| 3,563,095 | 2/1971 | Robinson, Jr. | 73/406 |
| 3,797,317 | 3/1974 | Peterson, Jr. | 73/756 |
| 4,218,926 | 8/1980 | DeVisser | 73/730 |
| 4,534,224 | 8/1985 | Raftis | 73/730 |
| 4,577,511 | 3/1986 | Wetzel | 73/756 |
| 4,630,635 | 12/1986 | Bernstein et al. | 137/315 |
| 4,763,527 | 8/1988 | Raftis | 73/730 |
| 4,788,871 | 12/1988 | Nelson et al. | 73/756 X |
| 4,840,068 | 6/1989 | Mayhew, Jr. | 73/730 |
| 4,884,452 | 12/1989 | Kaiser | 73/730 |
| 5,022,271 | 6/1991 | Hannon, Jr. | 73/730 |
| 5,076,280 | 12/1991 | Moriuchi et al. | 73/756 X |
| 5,148,712 | 9/1992 | Cross et al. | 73/756 |
| 5,154,083 | 10/1992 | Bernstein et al. | 73/730 |
| 5,295,747 | 3/1994 | Vinci | 73/756 X |
| 5,394,745 | 3/1995 | Freeman | 73/756 X |

*Primary Examiner*—Elizabeth L. Dougherty
*Assistant Examiner*—Paul D. Amrozowicz
*Attorney, Agent, or Firm*—Norman E. Lehrer

[57] ABSTRACT

A pressure monitoring isolating device for monitoring the pressure of fluid in a pipeline. The device comprises an annular housing that is axially insertable in the pipeline between two ends thereof. The annular housing has a central opening through which fluid in the pipeline flows. The central opening defines an inner diameter of the annular housing. Secured to the annular housing around the central opening thereof is a flexible sleeve member. An annular fluid chamber is positioned around and in communication with the outer surface of the sleeve member. A sensing fluid cavity extends radially from the annular fluid chamber toward the outer periphery of the annular housing. The annular fluid chamber and the sensing fluid cavity is filled with a sensing fluid. An elastomeric member seals the top end of the sensing fluid cavity. A pressure gauge assembly is releasably secured around the upper end of the sensing fluid cavity. The pressure gauge assembly includes a hollow needle extending downwardly therefrom and a pressure gauge. The needle extends into the sensing fluid cavity through the elastomeric member.

5 Claims, 1 Drawing Sheet

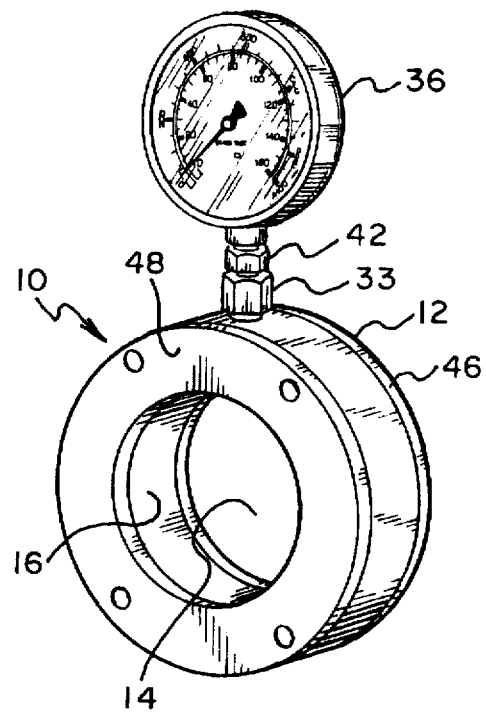
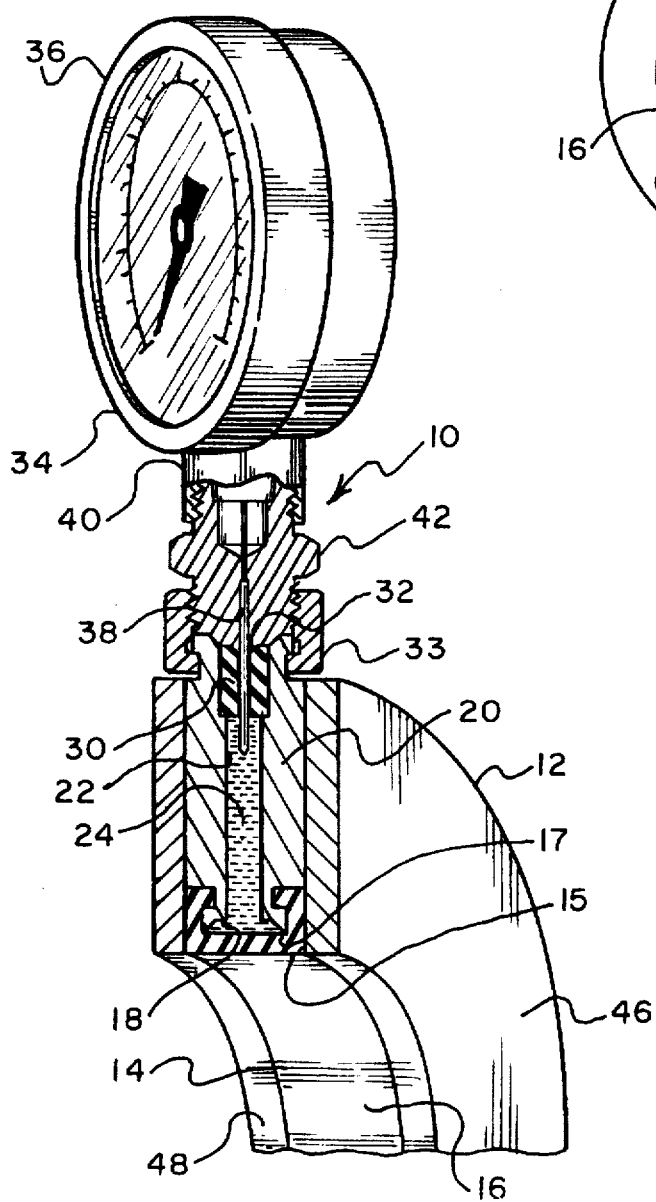
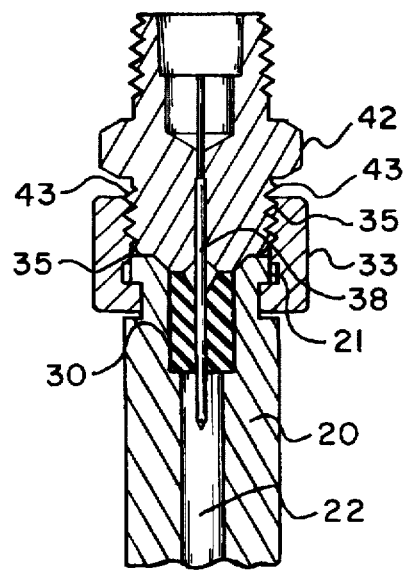

PRESSURE MONITORING ISOLATING DEVICE

BACKGROUND OF THE INVENTION

This invention relates to an improved pressure monitoring isolating device for monitoring the pressure of fluid in a pipeline and, more particularly, to such a device which minimizes the risk of losing pressure sensing fluid when an attached pressure gauge is removed therefrom.

There are numerous pressure monitoring devices in the prior art which are specifically adapted to monitor the flow of fluid through a pipeline at various positions therealong. These devices typically comprise an annular housing that is adapted to be interposed between two flanges of a pipeline and connected thereto. A flexible ring, preferably comprised of rubber, is received in the housing. The flexible ring has an inner diameter substantially equal to the diameter of the pipeline. A chamber is formed in the annular housing. The chamber is filled with a sensing fluid and has a pressure gauge associated therewith. As fluid travels through the pipeline and between the annular housing, fluid is forced against the flexible element which in turn places pressure on the fluid in the chamber. The pressure gauge is used to take a reading of this pressure. U.S. Pat. Nos. 4,218,926, 4,534,224, 4,763,527, 4,840,068, 5,022,271 and 5,154,083 disclose such devices.

The devices disclosed in each of these prior patents adequately isolate the pressure gauge from the fluid that passes through the pipelines. Such isolation is important as the composition, temperature or pressure of the fluid can permanently damage the pressure gauge.

However, none of the above mentioned devices effectively prevents the sensing fluid from being sprayed out of its associated chamber when the pressure gauge is removed from the same. The sensing fluid tends to spray out of the chamber when the pressure gauge is removed because the fluid running through the pipeline exerts pressure on the flexible element which in turn exerts pressure on the fluid in the chamber. If some sensing fluid is lost it must be replaced, otherwise the pressure gauge will not be able to take an accurate reading of the pressure. Replacing the sensing fluid is both costly and inconvenient.

In recognition of the foregoing, isolating devices have been developed which guard against the loss of sensing fluid during the removal of the pressure gauges from the associated devices. Such a prior art device is disclosed in U.S. Pat. No. 4,884,452. The device disclosed in this patent is similar to the devices discussed above with certain modifications. For example, the '452 device includes an annular sensing fluid chamber, a sensing fluid passage and a separate valve passage. A valve member is partially threadably secured to in the valve passage. When the pressure gauge has to be removed from the device, the valve member is threaded further into the valve passage to seal off the annular sensing fluid chamber so that there is no pressure applied to the sensing fluid in the fluid chamber. However, sensing fluid can still be spilled from the fluid chamber during the removal of the pressure gauge. Further, the '452 isolating ring requires substantial manufacturing costs. U.S. Pat. No. 4,082,002 discloses a similar device.

SUMMARY OF THE INVENTION

The present invention is designed to overcome the deficiencies of the prior art discussed above. It is an object of the invention to provide a pressure monitoring isolating device which allows a pressure gauge to be removed from the device with essentially no loss of sensing fluid.

It is a further object of the invention to provide such an isolating device which is relatively inexpensive to manufacture.

It is yet a further object of the invention to provide such an isolating device which allows a pressure gauge to be readily and easily changed.

In accordance with the illustrative embodiments, demonstrating features and advantages of the present invention, there is provided a pressure monitoring isolating device for monitoring the pressure of fluid in a pipeline. The device comprises an annular housing that is axially insertable in the pipeline between two ends thereof. The annular housing has a central opening through which fluid in the pipeline flows. The central opening defines an inner diameter of the annular housing. Secured to the annular housing around the central opening thereof is a flexible sleeve member.

An annular fluid chamber is positioned around and in communication with the outer surface of the sleeve member. A sensing fluid cavity extends radially from the annular fluid chamber toward the outer periphery of the annular housing. The annular fluid chamber and the sensing fluid cavity are filled with a sensing fluid. An elastomeric member seals the top end of the sensing fluid cavity. A pressure gauge assembly is releasably secured around the upper end of the sensing fluid cavity. The pressure gauge assembly includes a hollow needle extending downwardly therefrom and a pressure gauge. The needle extends into the sensing fluid cavity through the elastomeric member.

Other objects, features and advantages of the invention will be readily apparent from the following detailed description of a preferred embodiment thereof taken in conjunction with the drawings.

BRIEF DESCRIPTION OF THE DRAWINGS

For the purpose of illustrating the invention, there is shown in the accompanying drawings one form which is presently preferred; it being understood that the invention is not intended to be limited to the precise arrangements and instrumentalities shown.

FIG. 1 is a perspective view of the isolating device of the present invention;

FIG. 2 is a partial perspective view of the isolating device shown in partial cross-section, and FIG. 3 is a cross-sectional view taken along lines 3—3 of FIG. 2.

DETAILED DESCRIPTION OF THE PREFERRED EMBODIMENTS

Referring now to the drawings in detail wherein like reference numerals have been used throughout the various figures to designate like elements, there is shown in FIG. 1 a pressure monitoring isolating device constructed in accordance with the principles of the present invention and designated generally as 10.

The device comprises an annular housing 12 that is axially insertable in a pipeline (not shown) between two ends thereof. The annular housing 12 has a central opening 14 through which fluid in the pipeline flows. The central opening 14 defines an inner diameter of the annular housing.

A flexible sleeve member 16 is secured to the annular housing 12 around the central opening 14 thereof. The flexible sleeve member has an inner surface 15 and an outer surface 17 and is preferably comprised of rubber or the like (FIG. 2). Positioned around and in communication with the outer surface 17 of the sleeve member 16 is an annular fluid chamber 18.

A vertical channel member 20 projects radially outwardly from the annular housing 12. Extending around the upper periphery of the channel member 20 is a lip 21 as illustrated in FIG. 3. A sensing fluid cavity 22 extends downwardly through the vertical channel member 20 and into the annular housing 12. The bottom of the sensing fluid cavity communicates with the annular chamber 18. A sensing fluid 24, indicated by the dashed lines in FIG. 1, fills the annular fluid chamber 18 and the sensing fluid cavity 22. The fluid is preferably a liquid, however, the fluid can be a compressible solid material.

An elastomeric member 30 seals the upper end of the sensing fluid cavity 22. The elastomeric member is preferably comprised of rubber. A small bore 32 is formed vertically through the center of the elastomeric member 30. The bore is small enough so that when nothing is inserted therethrough the restoring forces of the elastomeric member cause the bore to seal so that sensing fluid cannot escape from the sensing fluid cavity 22.

A nut 33 is positioned around the lip 21 of vertical channel member 20 and extends upwardly therefrom as best illustrated in FIG. 3. The nut 33 has a plurality of internal threads 35 formed around the inner periphery thereof.

A pressure gauge assembly 34 is releasably secured to the upper end of the vertical channel member 20. The pressure gauge assembly 34 includes a pressure gauge 36 and a hollow needle 38 extending downwardly therefrom. Secured around the neck 40 of the pressure gauge 36 is a coupling segment 42. The coupling segment has a plurality of external threads 43 formed around the periphery thereof which are adapted to threadably engage the internal threads 35 of the nut 33.

The needle 38 has a predetermined diameter and extends into the sensing fluid cavity 24 through the bore 32 in the elastomeric member 30 when the coupling segment 42 threadably engages the nut 33.

In the preferred embodiment, the annular housing 12 includes two end plates 46 and 48. Each of the end plates is secured to a corresponding side of the annular housing 12 in order to facilitate the attachment of the device 10 to the pipeline.

In order to facilitate an understanding of the principles associated with the foregoing isolating device, its operation will now be briefly described. The pressure monitoring isolating device is installed between two ends of a pipeline in a conventional manner. Fluid from the pipeline flows through the central opening 14 of the annular housing 12. Pressure readings of the flowing fluid can be taken by the pressure gauge 36. This is accomplished in the following manner. The fluid presses against the sleeve member 16. Since the sleeve member is flexible, the pressure of the fluid causes the sleeve member to press against the sensing fluid 24 in the annular chamber 18 and the fluid in the sensing fluid cavity 22. The needle 38, which extends into the vertical channel member 20, communicates with the pressure gauge 36 so that a pressure reading can be taken. The elastomeric member 30 prevents any fluid from leaving the chamber.

When the pressure gauge 36 needs to be replaced, it is removed from the isolating device. The elastomeric member 30 allows the pressure gauge assembly 34 to be removed from the device without risking the loss of sensing fluid even though the fluid may be under significant pressure in the vertical channel member 20. More specifically, as the coupling segment 42 is unthreaded from the nut 33 and the needle 38 is removed from the hole 32 in the elastomeric member 30, the restoring forces in the elastomeric member 30 cause the bore 32 formed therethrough to be sealed so that no sensing fluid can escape.

The present invention may be embodied in other specific forms without departing from the spirit or essential attributes thereof and accordingly reference should be made to the appended claims rather than to the foregoing specification as indicating the scope of the invention.

What is claimed is:

1. A pressure monitoring isolating device for monitoring the pressure of fluid in a pipeline comprising:

an annular housing having an outer periphery and being axially insertable in said pipeline, said annular housing having a central opening through which said fluid in said pipeline flows, said central opening defining an inner diameter of said annular housing;

a flexible sleeve member secured to said annular housing around said central opening thereof, said sleeve member having inner and outer surfaces;

an annular fluid chamber positioned around and in communication with said outer surface of said sleeve member;

a sensing fluid cavity extending radially from said annular fluid chamber toward said outer periphery of said annular housing, said cavity having a free end;

a sensing fluid filling said annular fluid chamber and said sensing fluid cavity;

means for sealing said free end of said sensing fluid cavity, said sealing means including an elastomeric member located adjacent said free end of said sensing fluid cavity and having a bore passing substantially entirely therethrough, and a pressure gauge assembly and means for releasably securing said pressure gauge assembly to said sensing fluid cavity, said pressure gauge assembly including a hollow needle extending therefrom and a pressure gauge for monitoring the pressure of said fluid, said needle extending into said sensing fluid cavity through said bore in said elastomeric member, said bore in said elastomeric member having a diameter smaller than the diameter of said needle, said elastomeric member having restoring forces which cause said bore to seal when said needle of said pressure gauge assembly is removed therefrom.

2. The isolating device of claim 1 wherein said annular housing has an end plate secured to each side thereof for facilitating the securement of said device between two ends of said pipeline.

3. The isolating device of claim 1 further including a vertical channel member projecting outwardly from said annular housing, said free end of said sensing fluid cavity extending into said vertical channel member.

4. The isolating device of claim 3 further including means for threadably securing said pressure gauge assembly to said vertical channel member.

5. The isolating device of claim 4 wherein said securing means includes an internally threaded nut positioned around said vertical channel member and extending upwardly therefrom, and a coupling segment secured to said pressure gauge assembly, said coupling segment having external threads formed around the periphery thereof for threadably securing said pressure gauge assembly to said nut.

* * * * *